United States Patent Office 3,405,160
Patented Oct. 8, 1968

3,405,160
XENYL-ALKYL ISONITRILES
Ulrich Eholzer, Cologne, Uwe Fetzer and Ivar Ugi, Leverkusen, Ingeborg Hammann, Cologne, and Günter Unterstenhofer, Opladen, Germany, assignors to Farbenfabriken Bayer Aktiengesellschaft, Leverkusen, Germany, a corporation of Germany
No Drawing. Filed June 21, 1965, Ser. No. 465,712
Claims priority, application Germany, July 9, 1964,
F 43,384
2 Claims. (Cl. 260—465)

ABSTRACT OF THE DISCLOSURE

2–3 ring system polynuclear aromatic substituted $C_{1-8}$ aliphatic isonitriles having the formula R—A—NC and mixtures thereof with dispersible carrier vehicles having pesticidal, such as acaricidal, insecticidal and fungicidal, activity and usable to combat pests.

---

The present invention relates to particular polynuclear araliphatic isonitriles or isocyanides, to their compositions, as well as to the production and use thereof.

It is known that aliphatic and mononuclear araliphatic isonitriles, i.e. those containing 13 to 26 carbon atoms, possess insecticidal activity (see U.S. Patent 3,012,932) and that 2,6-dichlorophenyl isocyanide, in particular, possesses fungicidal activity (see Belgian Patent 625,036).

It is an object of the present invention to provide particular polynuclear araliphatic isonitriles having useful properties.

It is another object of the present invention to provide such polynuclear araliphatic isonitriles having 2 to 3 ring systems, and up to 8 carbon atoms in the aliphatic moiety, which possess significant pesticidal properties, especially acaricidal, insecticidal, and fungicidal action.

It is another object of the present invention to provide such polynuclear araliphatic isonitriles which possess a low toxicity toward warm-blooded animals as well as a low phytotoxicity, permitting wide application of the instant isonitriles for hygiene control purposes, and especially for crop control purposes.

It is still another object of the present invention to provide such polynuclear araliphatic isonitriles which possess acaricidal, insecticidal and fungicidal effectiveness, with the pesticidal effect or action appearing rapidly and lasting for a long time.

It is still another object of the present invention to provide xenyl-alkyl isonitriles or isocyanides in particular, which possess strong pesticidal, and especially acaricidal, insecticidal, and fungicidal activities.

It is still another object of the present invention to provide a process for producing polynuclear araliphatic isonitriles of the foregoing type in a versatile and efficient manner, and with comparatively high attendant yields.

It is a still further object of the present invention to provide a process for producing the aforementioned compounds utilizing a water-eliminating acyl halide in the presence of an acid binding agent in connection with the corresponding polynuclear araliphatic formamide from which water is eliminated during the reaction.

It is a still further object of the present invention to provide a process for the production of xenylalkyl isonitriles or isocyanides in particular, by reacting the corresponding xenyl formamide compound with a water-eliminating acyl halide in the presence of an acid binding agent.

It is a still further object of the present invention to provide compositions or formulations of the foregoing polynuclear araliphatic isonitriles with a carrier vehicle, such as a dispersible carrier liquid or a dispersible carrier solid.

It is a still further object of the present invention to provide such compositions or formulations utilizing thereon an acaricidally, and especially an insecticidally, or fungicidally, effective amount of such polynuclear araliphatic isonitrile.

It is a still further object of the present invention to provide such compoistions or formulations in which the particular polynuclear araliphatic isonitrile is present in the mixture with the carrier vehicle in an amount of substantially between about 0.0001 and 95% by weight of the mixture.

It is a still further object of the present invention to provide such compositions in the form of commercial preparations in which the active compound is present in an amount substantially between about 0.1–95% by weight of the mixture, and in the form of preparations for field application in which the active compound is present in an amount substantially between about 0.0001 and 2.0% by weight of the mixture.

It is a further object of the present invention to provide compositions of the foregoing type containing a dispersible carrier vehicle and a xenyl-alkyl isonitrile or isocyanide in a pesticidally effective amount.

It is a further object of the present invention to provide a method of using the foregoing polynuclear araliphatic isonitriles which contemplates combating pests by applying to such pests and their habitat a pesticidally effective amount of the instant polynuclear araliphatic isonitriles.

It is a still further object of the present invention to provide, in particular, methods of combating acarids, insects, and fungi, which contemplate applying to such acarids, insects, and/or fungi, an acaricidally, insecticidally, or fungicidally effective amount, as the case may be, of the active compound in question.

It is still a further object of the present invention to provide a method of combating pests which contemplates applying to such pests and their habitat a xenyl-alkyl isonitrile or isocyanide in a pesticidally effective amount.

Other and further objects of the present invention will become apparent from a study of the within specification and accompanying examples.

It has been found, in accordance with the present invention, that polynuclear araliphatic isonitriles having the formula

R—A—NC           (I)

in which A represents an aliphatic hydrocarbon radical having 1 to 8 carbon atoms and R represents a polynuclear aromatic hydrocarbon radical having 2 to 3 ring systems, possess strong acaricidal, insecticidal, and fungicidal actions and effects.

In this connection, A may represent preferably a saturated aliphatic radical containing 1 to 8 carbon atoms, such as $C_1$–$C_8$ alkyl, including methyl, ethyl, n-propyl, isopropyl, n-butyl, isobutyl, sec.-butyl, the amyls to the octyls inclusive, and the like, whereas R may represent preferably an aromatic system containing 2 to 3 rings, which are bound directly, including for example xenyl, and the like.

The instant new polynuclear araliphatic isonitriles having the general Formula I above may be obtained conveniently by reacting a formamide having the formula

R—A—NH—CHO           (II)

in which A and R are the same as defined above, with a water-eliminating acyl halide in the presence of a base, i.e. an acid binding agent, whereby to form the corresponding polynuclear araliphatic isonitrile.

Surprisingly, the new polynuclear araliphatic isonitriles according to the present invention possess a substantially higher insecticidal, acaricidal and fungicidal activity than the previously known biocidal isonitriles. Furthermore, the instant compounds have a multiple activity, and accordingly they are simultaneously active, for example, against insects, mites and fungi. The instant new isonitriles are, therefore, a valuable addition to the art.

In accordance with a particular embodiment of the present invention, where 1-formylamino-1-diphenyl-ethane is reacted with phosgene and triethylamine, the course of the reaction can be illustrated by the following equation:

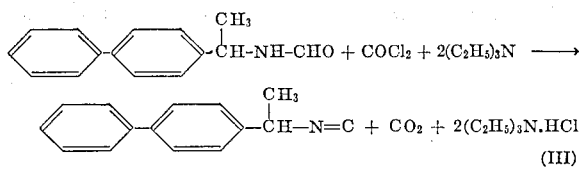

(III)

The polynuclear araliphatic formamides which may be used as starting materials for producing the corresponding polynuclear araliphatic isonitriles, are clearly evident from Formula II noted above. Typical starting formamides include, for example, 1-xenyl-methyl formamide, 1-xenyl-ethyl formamide (i.e. 1-formylamino-1-diphenyl-ethane), and the like.

In accordance with the present invention, the reaction for producing the instant compounds is carried out expediently in the presence of solvents or dispersing agents. As such solvents or dispersing agents, there may be used all inert organic solvents, preferably hydrocarbons, such as aliphatic hydrocarbons, and especially paraffins, including petroleum fractions such as benzine fractions having a boiling point between about 30 and 160° C., especially $C_5$–$C_9$ aliphatic hydrocarbons, and the like; cycloaliphatic hydrocarbons, such as cycloalkyl, and especially cyclo lower alkyl hydrocarbons, including cyclopentane, cyclohexane, and the like; aromatic hydrocarbons, and especially unsubstituted-, as well as mono-, di-, and trilower alkyl substituted-, and nitro substituted-mononuclear aryl hydrocarbons having 6 ring carbon atoms, including benzene, toluene, xylene, mesitylene, nitrobenzene, and the like; halogenated aliphatic hydrocarbons, and especially chlorinated aliphatic hydrocarbons, including chlorinated lower alkyl and lower alkenyl hydrocarbons and especially di-, tri-, and tetra-chloro substituted lower alkyl- and lower alkenyl-hydrocarbons, such as methylene chloride, chloroform, carbon tetrachloride, trichloroethylene, tetrachloroethane, and the like; halogenated aromatic hydrocarbons, such as halogen substituted mononuclear aryl hydrocarbons having 6 ring carbon atoms, including mono-, di-, and tri-chlorobenzene, and the like; ethers, such as open chain aliphatic ethers and cyclic aliphatic ethers, and especially di-$C_1$–$C_6$ lower alkyl ethers, including dimethyl ether, diethyl ether, methylethyl ether, diisopropyl ether, diisobutyl ether, and the like, as well as cycloalkyl ethers, including dioxan, furan, tetrahydrofuran, and the like; esters, and especially $C_1$–$C_4$ alkyl-alkanoyloxy esters, including methyl-, ethyl-, propyl-, butyl-, etc. esters of formic, acetic, propionic, butyric, etc. acids, especially ethyl acetate, and the like; nitriles, and especially aliphatic nitriles, such as alkane nitriles, for example $C_1$–$C_4$ lower alkyl cyanides, including acetonitrile, propionitrile, butyronitrile, and the like; alcohols, and especially aliphatic alcohols, such as alkylols, and preferably $C_1$–$C_4$ lower alkanols, including methanol, ethanol, propanol, n-butanol, and particularly tert.-butanol, and the like; amines, such as heterocyclic amines, and especially cyclic amines having 6 ring members, including at least one nitrogen atom, including pyridine, as well as aliphatic amines, and especially tert.-aliphatic amines, such as tri-$C_1$–$C_4$ lower alkylamines, including trimethylamine, triethylamine, tripropylamine, tributylamine, methylethylpropylamine, diethylbutylamine, and the like; ketones, and especially dialkyl ketones, for example, di-$C_3$–$C_{12}$ lower alkyl ketones, i.e. dimethyl ketone (acetone), methylethyl ketone, diethyl ketone, methyl isopropyl ketone, ethyl isopropyl ketone, diisopropyl ketone, methyl butyl ketone, ethyl isobutyl ketone, dibutyl ketone, dihexyl ketone, and mixtures of such solvents.

As water-eliminating acyl halides, usable in accordance with the present invention, there may be mentioned, in particular, phosgene, methane-sulfochloride, benzene-sulfochloride, phosphorus oxychloride, phosphorus oxybromide and cyanuric chloride.

Typical bases or acid binding agents usable according to the present invention include alkali metal hydroxides such as sodium hydroxide, potassium hydroxide, lithium hydroxide, and the like; alkali metal carbonates, such as sodium carbonate, potassium carbonate, lithium carbonate, and the like; alkali metal bicarbonates, such as sodium bicarbonate, potassium bicarbonate, lithium bicarbonate, and the like; corresponding ammonium compounds, such as ammonium hydroxide, ammonium carbonate, ammonium bicarbonate, and the like; tertiary amines, including tertiary heterocyclic amines, and especially pyridine, quinoline, and the like; tertiary aliphatic amines and especially tertiary alkyl amines, such as trimethylamine, triethylamine, diethylmonomethylamine, tripropylamine, dimethylcyclohexylamine, tetramethyl-ethylene-diamine, and the like, such as alkyl amines thus contemplating $C_1$–$C_6$ trilower alkyl amines having various straight and branched chain substituents, including methyl, ethyl, n-propyl, isopropyl, n-butyl, isobutyl, sec.-butyl, tert.-butyl, the amyls, and the hexyls, as well as $C_5$–$C_6$ cyclo lower alkyl substituted amines, including cyclopentyl, cyclohexyl, and the like, and corresponding mixed dialkyl- and monocycloalkyl substituted- and monoalkyl- dicycloalkyl substituted- amines wherein the alkyl substituent or substituents and the cycloalkyl substituent or substituents contemplate the foregoing enumerated substituents; as well as mixed N-araliphatic N-aliphatic amines, and especially N-mononuclear $C_6$ aralkyl-N-lower alkyl-amines, such as dimethyl-benzylamine, and the like; and mixtures of such acid binding agents.

Alcoholates, such as alkylolates, and especially $C_1$–$C_4$ lower alkanolates, may also be used as bases or acid binding agents, including alkali metal alkylolates, and especially sodium- and potassium-methylate, ethylate, propylate, butylate, and the like, including especially for example potassium-tert.-butylate.

Especially advantageous combinations of acyl halides and bases in this regard are phosgene and tertiary aliphatic amines, benzene-sulfochloride and pyridine, phosphorus oxychloride and pyridine or potassium-tert.-butylate, and cyanuric chloride and potassium carbonate.

The reaction temperatures in accordance with the present invention may be varied within a fairly wide range. In general, the operation is carried out at temperatures substantially between about $-50$ and $+100°$ C., and preferably between about $-20$ and $+60°$ C.

For carrying out the process according to the present invention, it is expedient to react 1 mol of the formamide in 0.5 to 5 litres of solvent with substantially between about 1–5, preferably 1.8–3, equivalents of base, and substantially between about 0.5–2.5, preferably 0.9 to 1.5, water equivalents of acyl halide.

Working up is performed in the usual manner, for example, by mixing with water, separating and concentrating, or by the addition of ammonia, filtration and concentration. The crude product can be purified by washing, crystallization or reprecipitation, if desired with the use of an additive which adsorbs impurities.

Typical examples of isonitriles according to the present invention are: 1-xenyl-methyl isocyanide, 1-xenyl-ethyl isocyanide, and the like.

Advantageously, the compounds according to the present invention have strong insecticidal and acaricidal effects but only a low toxicity towards warm-blooded animals and a low phytotoxicity. The effects appear rapidly and are long-lasting. The instant compounds can, therefore, be used with good results for combating noxious sucking and biting insects, Diptera and mites.

In this connection, typical sucking insects essentially include herein aphids, such as the peach aphid (*Myzus persicae*); coccids, such as *Aspidiotus hederae*, *Hercinothrips femoralis*; and bugs, such as the beet leaf bug (*Piesma quadrata*); and the like.

Typical biting insects herein contemplated essentially include butterfly larvae, such as caterpillars (*Plutella maculipennis*); beetles, such as grain weevils (*Calandra granaria*), but also species living in the soil, such as wire worms (*Agriotes sp.*); cockroaches, such as the German cockroach (*Blatella germanica*); Orthoptera, such as the cricket (*Gryllus domesticus*); and Hymenoptera, such as ants, and the like.

Also, the Diptera especially comprise the flies, such as the banana fruit fly (*Drosophila melanogaster*), the house fly (*Musca domestica*); and gnats, such as the mosquito (*Aedes aegypti*); and the like.

Especially important among the mites under consideration herein are the spider mites (Tetranychides), such as the common spider mite (*Tetranychus telarius*); gall mites, such as the red current gall mite (*Eriophyes ribis*), and Tarsonemides, such as *Tarsonemus pallidus*; and ticks; and the like.

The new isonitriles according to the present invention also have a fungitoxic activity and can, therefore, be used, in particular, for combating phytopathogenic fungi, and especially because of their good compatibility with higher plants the same may be used with advantage as plant protective agents against plant fungus diseases.

The new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

In general, the compositions or formulations contain substantially between about 0.1 and 95 percent by weight of the active compound, and preferably substantially between about 0.5 and 90 percent by weight.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

Application for the foregoing pesticidal purposes is achieved in the usual manner, for example, by watering, spraying, atomizing, vaporizing, scattering, dusting, and the like.

The following examples are given for the purpose of illustrating, while not limiting, the present invention as regards the pesticidal effectiveness of the instant compounds:

Example 1.—Plutella test

Solvent: 3 parts by weight dimethyl formamide.
Emulsifier: 1 part by weight alkyl-aryl polyglycol ether.

To produce a suitable preparation of the active compound, 1 part by weight of such active compound is mixed with the stated amount of solvent containing the stated amount of emulsifier, and then the concentrate obtained is diluted with water to the desired concentration.

Cabbage leaves (*Brassica oleracea*) are sprayed with the preparation of the active compound until dew moist and infected with caterpillars of the diamond-back moth (*Plutella maculipennis*).

After the specified periods of time, the degree of destruction is determined percentagewise. 100% indicates that all the caterpillars are killed, whereas 0% indicates that none of them is killed.

The active compounds, their concentrations, the evaluation times, and the results obtained can be seen from Table 1 which follows:

TABLE 1.—PLANT-DAMAGING INSECTS

| Active compound | Concentration of active compound in percent | Degree of destruction in percent after 4 days |
|---|---|---|
| (III') ⟨phenyl⟩-⟨phenyl⟩-CH-CH₃ / NC | 0.2 / 0.02 | 100 / 100 |

Example 2.—Doralis test (contact action)

Solvent: 3 parts by weight dimethyl formamide.
Emulsifier: 1 part by weight alkylaryl polyglycol ether.

To produce a suitable preparation of the active compound, 1 part by weight of such active compound is mixed with the stated amount of solvent containing the stated amount of emulsifier, and then the concentrate obtained is diluted to the desired concentration.

Bush bean plants (*Vicia faba*) which have been strongly infested with black bush bean aphids (*Doralis fabae*) are sprayed with the preparation of the active compound until dripping wet.

After the specified periods of time, the degree of destruction is determined percentagewise. 100% means that all the aphids are killed, whereas 0% means that none of them is killed.

The active compounds, their concentrations, the evaluation times, and the results obtained can be seen from Table 2 which follows:

TABLE 2.—PLANT-DAMAGING INSECTS

| Active compound | Concentration of active compound in percent | Degree of destruction in percent after 24 hours |
|---|---|---|
| (III'')  | 0.2 | 100 |

Example 3.—Tetranychus test

Solvent: 3 parts by weight dimethyl formamide.
Emulsifier: 1 part by weight alkyl aryl polyglycol ether.

To produce a suitable preparation of the active compound, 1 part by weight of such active compound is mixed with the stated amount of solvent containing the stated amount of emulsifier, and then the concentrate obtained is diluted with water to the desired concentration.

Bean plants (*Phaseolus vulgaris*) which have a height of approximately 10 to 30 cm., are sprayed with the preparation of the active material until dripping wet. These bean plants area heavily infested with bean spider mites (*Tetranychus telarius*) in all stages of development.

After the specified periods of time, the effectiveness of the preparation of active compound is determined by counting the dead animals. The degree of destruction thus obtained is given percentagewise. 100% means that all the spider mites are killed, whereas 0% means that none of them is killed.

The active compounds, their concentrations, the evaluation times, and the results obtained can be seen from Table 3 which follows:

TABLE 3.—PLANT-DAMAGING MITES

| Active compound | Concentration of active compound in percent | Degree of destruction in percent after 8 days |
|---|---|---|
| (III''') 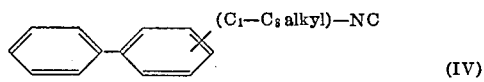 | 0.2 | 100 |
|  | 0.02 | 100 |
|  | 0.002 | 100 |
|  | 0.0002 | 60 |
| n-C₁₂H₂₅—NC (known) | 0.02 | 0 |

As may be seen from the test data in Example 3, a 100 fold difference in effectiveness is found utilizing the instant polynuclear araliphatic isonitrile compound as opposed to the known aliphatic isonitrile taking the 0 result obtained with the known compound as a base. Nevertheless, it will occur to the artisan that even larger amounts of the known compound would lead to little or no pesticidal effectiveness, making the above results even more meaningful. As may be appreciated, the foregoing 100 fold increase is also obtained utilizing an amount of the instant compound which is one-tenth that of the known compound used, yet the results are similarly startling. With an amount of the instant compound which is one-hundredth that of the known compound, significant results are still achieved. Accordingly, the potency of the compounds coming within the purview of the present invention is demonstrated, as compared with the potency of the known compound, and it will occur to the artisan that advantageously less of the instant type compounds may be used for achieving good results than would be the case with the prior art compound, or that utilizing similar amounts of the instant type compounds to those of the known compound may well lead to complete destruction of the pests in question in a shorter period of time.

The following examples are given for the purpose of illustrating, while not limiting, the present invention, as concerns the process for producing the instant compounds.

Example 4.—α-Xenyl-ethyl-isocyanide

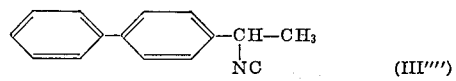

112 parts by weight of 1 - formylamino - 1 - xenyl-ethane (M.P. 90–91° C., prepared from 4 - aceto - diphenyl by a Wallach-Leuckardt reaction are dissolved in methylene chloride and triethylamine (320 ml. and 500 ml. respectively per mol formyl-derivative). Then, 50 parts by weight of phosgene are introduced at boiling temperature. After the reaction has been completed, the mixture is suction-filtered, concentrated, and from the residue 19 parts by weight α - xenyl - ethyl - isocyanide are obtained by extraction with petroleum ether; M.P. 45–46° C.

Example 5

Example 4 is repeated utilizing the corresponding molar amount of phosgene, under the stated conditions, with the following starting compounds respectively: 1 - xenyl-methyl formamide, 2 - xenyl - ethyl formamide (i.e. 1-formylamino - 2 - diphenyl - ethane), 1 - formylamino-3 - diphenyl - propane, 1 - formylamino - 4 - diphenyl-n - butane, 2 - formylamino - 2 - diphenyl - n - pentane, 2 - formylamino - 3 - diphenyl - hexane, 1 - formylamino-1 - diphenyl - octane, 4 - formylamino - 4 - diphenyl-octane, and the like, whereby the following compounds respectively are produced: 1 - xenyl - methyl isocyanide, 2 - xenyl - ethyl isocyanide [β - (p - xenyl) - ethyl isocyanide], 3 - xenyl - propyl isocyanide [γ - (p - xenyl)-propyl - 1 isocyanide], 4 - xenyl - n - butyl - 1 isocyanide, 2 - xenyl - n - pentyl - 2 - isocyanide, 3 - xenyl - hexyl - 2 isocyanide, 1 - xenyl - octyl - 1 - isocyanide, 4 - xenyl-octyl - 4 isocyanide, and the like.

Each of the foregoing isonitrile or isocyanide compounds, of course, possess the desired high insecticidal, acaricidal and fungicidal activity, whereby a multiple action is possible with such compounds rendering them advantageously useful, because of the attendant low toxicity toward warm-blooded animals and low phytotoxicity, particularly as crop control agents, especially with regard to agricultural crops. The biocidal effectiveness of the instant compounds manifests itself rapidly and lasts for a long time.

Therefore, as the artisan will appreciate, the compounds coming within the purview of Formula I above produced from starting formamides of Formula II above, including especially xenyl-alkyl isocyanides having the formula $$\text{(C}_1\text{—C}_8\text{ alkyl)—NC} \quad \text{(IV)}$$

are eminently suitable per se or in pesticidal compositions in the form of a mixture with a dispersible carrier vehicle such as a carrier liquid or a carrier solid for biocidal purposes of the type in question. Such carrier vehicle mixtures generally contemplate an amount of the instant isonitrile or isocyanide therein which is biocidally, i.e. insecticidally, acaricidally, and/or fungicidally effective for the purpose in question, and which is generally substantially between about 0.0001–95% by weight of the mixture. As concerns commercial preparations, these generally contemplate carrier composition mixtures in which the active compound is present in an amount substantially between about 0.1–95% by weight and preferably 0.5–90% by weight of the mixture, whereas carrier compositions suitable for field application generally contemplate those in which the active compound is present in an amount substantially between about 0.0001 and 2.0% by weight, and preferably substantially between about 0.0002 and 1.0% by weight of the mixture.

Accordingly, the present invention also contemplates a method of combating pests, especially insects and acarids, and a method of combating fungi, which comprises applying to such pests and/or fungi and their habitat, as the case may be, a pesticidally and/or fungicidally effective amount of a polynuclear araliphatic isonitrile of Formula I, either per se or in a carrier vehicle mixture, preferably with the amount of the active compound being present in such mixture in a field application concentration range of the type noted hereinabove.

It will be appreciated that the instant specification and examples are set forth by way of illustration, and not limitation, and that various modifications and changes may be made without departing from the spirit and scope of the present invention which is to be limited only by the scope of the appended claims.

What is claimed is:
1. Xenyl-alkyl isocyanides having the formula

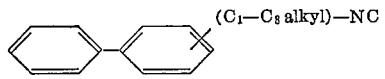

2. α-(p-Xenyl)-ethyl-isocyanate having the formula

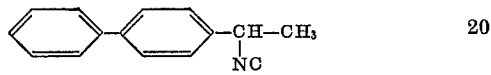

References Cited
UNITED STATES PATENTS
2,342,794  2/1944  Dreyfus _____ 260—464
3,012,932  12/1961 Bussent et al. _____ 260—464 X

FOREIGN PATENTS
625,036  5/1963  Belgium.

OTHER REFERENCES
"A Novel Preparation of Isonitriles," Hertler et al., August 1958, Journal of Organic Chemistry, pp. 1221–1222.

CHARLES B. BAKER, *Primary Examiner.*

S. T. LAWRENCE III, *Assistant Examiner.*